US012668246B2

(12) United States Patent
Tariq et al.

(10) Patent No.: US 12,668,246 B2
(45) Date of Patent: Jun. 30, 2026

(54) VEHICLE CONTROL SYSTEM, METHOD FOR CONTROLLING VEHICLE, AND VEHICLE

(71) Applicant: Honda Motor Co., Ltd., Tokyo (JP)

(72) Inventors: Faizan M. Tariq, San Jose, CA (US); David F. Isele, Sunnyvale, CA (US); Sangjae Bae, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 18/521,911

(22) Filed: Nov. 28, 2023

(65) Prior Publication Data

US 2025/0171027 A1 May 29, 2025

(51) Int. Cl.
*B60W 30/182* (2020.01)
*B60W 30/09* (2012.01)
*B60W 30/095* (2012.01)
*B60W 40/06* (2012.01)

(52) U.S. Cl.
CPC .......... *B60W 30/182* (2013.01); *B60W 30/09* (2013.01); *B60W 30/0956* (2013.01); *B60W 40/06* (2013.01); *B60W 2554/80* (2020.02)

(58) Field of Classification Search
CPC .............. B60W 30/182; B60W 30/09; B60W 30/0956; B60W 40/06; B60W 2554/80; B60W 2554/801; B60W 2554/802; B60W 2554/804; B60W 60/0013; B60W 60/0015
See application file for complete search history.

(56) References Cited

U.S. PATENT DOCUMENTS

| | | | | |
|---|---|---|---|---|
| 11,932,240 | B2 * | 3/2024 | Mase .................... | B60W 30/09 |
| 12,296,850 | B2 * | 5/2025 | Ling .................... | B60W 40/04 |
| 2021/0061267 | A1 * | 3/2021 | Schlender ......... | B60W 30/0956 |
| 2022/0194368 | A1 * | 6/2022 | Nemoto .................. | H04W 4/46 |

OTHER PUBLICATIONS

J. A. E. Andersson, J. Gillis, G. Horn, J. B. Rawlings, and M. Diehl, "CasADi—A software framework for nonlinear optimization and optimal control," Mathematical Programming Computation, vol. 11, No. 1, pp. 1-36, 2019.
A. Azzalini and A. D. Valle, "The multivariate skew-normal distribution," Biometrika, vol. 83, No. 4, pp. 715-726, 1996.
S. Bae, D. Saxena, A. Nakhaei, C. Choi, K. Fujimura, and S. Moura, "Cooperation-aware lane change maneuver in dense traffic based on model predictive control with recurrent neural network," in 2020 American Control Conference (ACC). IEEE, 2020, pp. 1209-1216.

(Continued)

*Primary Examiner* — Jason Holloway
(74) *Attorney, Agent, or Firm* — Rankin, Hill & Clark LLP

(57) ABSTRACT

A method for controlling a vehicle and a vehicle control system control a vehicle in one of a motion planning mode and a crash mitigation mode. To switch from the motion planning mode to the crash mitigation mode, both instantaneous and predictive risk evaluation techniques are employed, and a hysteresis band is used to return control from the crash mitigation mode to the motion planning mode. When in the crash mitigation mode, assessments are made as to whether leaving a road boundary or engaging a less severe collision minimize harm in a high-risk environment.

20 Claims, 5 Drawing Sheets

(56) References Cited

OTHER PUBLICATIONS

S. Boyd, S. P. Boyd, and L. Vandenberghe, Convex optimization. Cambridge university press, 2004.

A. Dosovitskiy, G. Ros, F. Codevilla, A. Lopez, and V. Koltun, "Carla: An open urban driving simulator," in Conference on robot learning. PMLR, 2017, pp. 1-16.

I. S. Duff, "Sparse system solution and the hsl library," Some topics in industrial and applied mathematics, vol. 8, pp. 78-94, 2006.

P. Falcone, F. Borrelli, J. Asgari, H. E. Tseng, and D. Hrovat, "Predictive active steering control for autonomous vehicle systems," IEEE Transactions on Control Systems Technology, vol. 15, No. 3, pp. 566-580, 2007.

Y. Gao, T. Lin, F. Borrelli, E. Tseng, and D. Hrovat, "Predictive control of autonomous ground vehicles with obstacle avoidance on slippery roads," in Dynamic systems and control conference, vol. 44175, 2010, pp. 265-272.

M. P. Huijser, T. D. Holland, A. V. Kociolek, A. M. Barkdoll, J. D. Schwalm et al., "Animal-vehicle crash mitigation using advanced technology: phase ii, system effectiveness and system acceptance." Oregon. Dept. of Transportation. Research Unit, Tech. Rep., 2009.

M. P. Huijser, P. T. McGowen, W. Camel et al., "Animal vehicle crash mitigation using advanced technology phase i: Review, design, and implementation," 2006.

I. Isaksson-Hellman and M. Lindman, "Evaluation of rear-end collision avoidance technologies based on real world crash data," Pro-ceedings of the Future Active Safety Technology Towards zero traffic accidents (FASTzero), Gothenburg, Sweden, pp. 9-11, 2015.

A. Kesting, M. Treiber, and D. Helbing, "General lane-changing model mobil for car-following models," Transportation Research Record, vol. 1999, No. 1, pp. 86-94, 2007. [Online]. Available: https://doi.org/10.3141/1999-10.

J. Kong, M. Pfeiffer, G. Schildbach, and F. Borrelli, "Kinematic and dynamic vehicle models for autonomous driving control design," in 2015 IEEE intelligent vehicles symposium (IV). IEEE, 2015, pp. 1094-1099.

K. Lee and D. Kum, "Collision avoidance/mitigation system: Motion planning of autonomous vehicle via predictive occupancy map," IEEE Access, vol. 7, pp. 52 846-52 857, 2019.

S. Lefèvre, D. Vasquez, and C. Laugier, "A survey on motion prediction and risk assessment for intelligent vehicles," ROBOMECH journal, vol. 1, No. 1, pp. 1-14, 2014.

V. Milanés, J. Pérez, J. Godoy, and E. Onieva, "A fuzzy aid rearend collision warning/avoidance system," Expert Systems with Applications, vol. 39, No. 10, pp. 9097-9107, 2012.

A. Moradipari, S. Bae, M. Alizadeh, E. M. Pari, and D. Isele, "Predicting parameters for modeling traffic participants," in 2022 IEEE 25th International Conference on Intelligent Transportation Systems (ITSC). IEEE, 2022, pp. 703-708.

M. Müller, M. Botsch, D. Böhmländer, and W. Utschick, "Machine learning based prediction of crash severity distributions for mitigation strategies," Journal of Advances in Information Technology, vol. 9, No. 1, pp. 15-24, 2018.

B. Paden, M. Cáp, S. Z. Yong, D. Yershov, and E. Frazzoli, "A survey of motion planning and control techniques for self-driving urban vehicles," IEEE Transactions on intelligent vehicles, vol. 1, No. 1, pp. 33-55, 2016.

Y. Qin, E. Hashemi, and A. Khajepour, "Integrated crash avoidance and mitigation algorithm for autonomous vehicles," IEEE Transactions on Industrial Informatics, vol. 17, No. 11, pp. 7246-7255, 2021.

D. Sam, C. Velanganni, and T. E. Evangelin, "A vehicle control system using a time synchronized hybrid vanet to reduce road accidents caused by human error," Vehicular comm., vol. 6, pp. 17-28, 2016.

X. Shang and A. Eskandarian, "Emergency collision avoidance and mitigation using model predictive control and artificial potential func-tion," IEEE Transactions on Intelligent Vehicles, 2023.

S. Singh, "Critical reasons for crashes investigated in the national motor vehicle crash causation survey," Tech. Rep., 2015.

F. M. Tariq, D. Isele, J. S. Baras, and S. Bae, "Slas: Speed and lane advisory system for highway navigation," in 2022 61st IEEE Conference on Decision and Control (CDC), 2022.

F. M. Tariq, N. Suriyarachchi, C. Mavridis, and J. S. Baras, "Autonomous vehicle overtaking in a bidirectional mixed-traffic setting," in 2022 American Control Conference (ACC). IEEE, 2022, pp. 3132-3139.

Faizan M. Tariq, Nilesh Suriyarachchi, Christos Mavridis and John S. Baras, "Cooperative bidirectional mixed-traffic overtaking," in 2022 IEEE 25th International Conference on Intelligent Transportation Systems (ITSC). IEEE, 2022, pp. 2494-2501.

A. Wächter and L. T. Biegler, "On the implementation of an interior-point filter line-search algorithm for large-scale nonlinear program-ming," Mathematical programming, vol. 106, pp. 25-57, 2006.

H. Wang, Y. Huang, A. Khajepour, Y. Zhang, Y. Rasekhipour, and D. Cao, "Crash mitigation in motion planning for autonomous vehi-cles," IEEE transactions on intelligent transportation systems, vol. 20, No. 9, pp. 3313-3323, 2019.

Y. Zhang, E. K. Antonsson, and K. Grote, "A new threat assessment measure for collision avoidance systems," in 2006 IEEE Intelligent Transportation Systems Conference. IEEE, 2006, pp. 968-975.

* cited by examiner

VEHICLE CONTROL SYSTEM, METHOD FOR CONTROLLING VEHICLE, AND VEHICLE

BACKGROUND

Vehicles driven in open environments, such as roadways, may now benefit from advanced driver assistance systems which assist a user in efficiently driving the vehicle, and/or from autonomous driving systems which may drive the vehicle with minimal or no user input. Generally, while operating on roadways, the advanced driver assistance systems and autonomous driving systems have two primary goals of traveling efficiently and comfortably. Circumstances may be present during operation that put these goals in conflict, particularly when the vehicle is in a high-risk environment in which a risk of collision is high.

Conventional advanced driver assistance systems and autonomous driving systems may benefit from balancing when to emphasize and deemphasize passenger comfort based on the assessment of the high-risk environment. Additionally, when the vehicle is in the high-risk environment, conventional evasive maneuvers to mitigate the crash risk and severity may not consider all possible options.

BRIEF DESCRIPTION

According to one aspect, a method is provided for controlling a vehicle. The method includes determining whether a distance between the vehicle and a collision object is less than a first predetermined distance based on estimated positions of the vehicle and the collision object, and determining whether a time to close encounter between the vehicle and the collision object is less than a first predetermined time to close encounter based on estimated trajectories of the vehicle and the collision object. The method determines that the vehicle is operating in a high-risk environment when the distance is less than the first predetermined difference. The method determines that the vehicle is operating in the high-risk environment when the time to close encounter is less than the first predetermined time to close encounter. When the vehicle is determined to be operating in the high-risk environment, the vehicle is controlled in a crash mitigation mode with an occupant comfort parameter in a crash mitigation range. When the vehicle is not determined to be operating in the high-risk environment, the vehicle is controlled in a motion planning mode with the occupant comfort parameter in a motion planning range, the motion planning range being higher than the crash mitigation range.

According to another aspect, a vehicle control system is provided in a vehicle and includes a vehicle electronic control unit in communication with a vehicle sensor system and a vehicle actuator system. The electronic control unit is programmed to: estimate a distance between the vehicle and a collision object based on input from the vehicle sensor system; estimate trajectories of the vehicle and the collision object based on input from the vehicle sensor system; determine a time to close encounter between the vehicle and the collision object based on the estimated trajectories. The electronic control unit determines whether the distance is less than a first predetermined distance and whether the time to close encounter is less than a first predetermined time to close encounter. The electronic control unit determines that the vehicle is operating in a high-risk environment when the distance is less than the first predetermined difference. The electronic control unit determines that the vehicle is operating in the high-risk environment when the time to close encounter is less than the first predetermined time to close encounter. When the vehicle is determined to be operating in the high-risk environment, the electronic control unit controls the vehicle actuator system to control the vehicle in a crash mitigation mode with an occupant comfort parameter in a crash mitigation range. When the vehicle is not determined to be operating in the high-risk environment, the electronic control unit controls the vehicle actuator system to control the vehicle in a motion planning mode with the occupant comfort parameter in a motion planning range, the motion planning range higher than the crash mitigation range.

According to yet another aspect, a vehicle is provided which includes a vehicle sensor system, a vehicle actuator system, and a vehicle electronic control unit in communication with the vehicle sensor system and the vehicle actuator system. The electronic control unit is programmed to: estimate a distance between the vehicle and a collision object based on input from the vehicle sensor system; estimate trajectories of the vehicle and the collision object based on input from the vehicle sensor system; and determine a time to close encounter between the vehicle and the collision object based on the estimated trajectories. The electronic control unit determines whether the distance is less than a first predetermined distance and whether the time to close encounter is less than a first predetermined time to close encounter. The electronic control unit determines that the vehicle is operating in a high-risk environment when the distance is less than the first predetermined difference. The electronic control unit determines that the vehicle is operating in the high-risk environment when the time to close encounter is less than the first predetermined time to close encounter. When the vehicle is determined to be operating in the high-risk environment, the electronic control unit controls the vehicle actuator system to control the vehicle in a crash mitigation mode with an occupant comfort parameter in a crash mitigation range. When the vehicle is not determined to be operating in the high-risk environment, the electronic control unit controls the vehicle actuator system to control the vehicle in a motion planning mode with the occupant comfort parameter in a motion planning range, the motion planning range being higher than the crash mitigation range.

DETAILED DESCRIPTION

Figure 1:
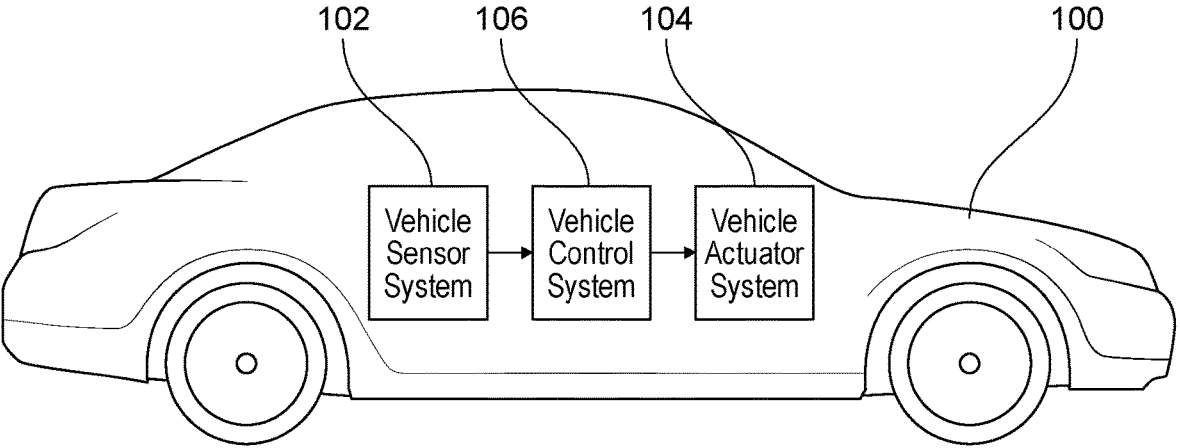
FIG. 1 is a schematic illustration of a vehicle including a vehicle control system, a vehicle sensor system, and a vehicle actuator system.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory," as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive," as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus," as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database," as used herein, may refer to a table, a set of tables, and a set of data stores (e.g., disks) and/or methods for accessing and/or manipulating those data stores.

An "operable connection," or a connection by which entities are "operably connected", is one in which signals, physical communications, and/or logical communications may be sent and/or received. An operable connection may include a wireless interface, a physical interface, a data interface, and/or an electrical interface.

A "computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle," as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system," as used herein, may be any automatic or manual systems that may be used to enhance the vehicle, and/or driving. Exemplary vehicle systems include an advanced driver assistance system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 2:
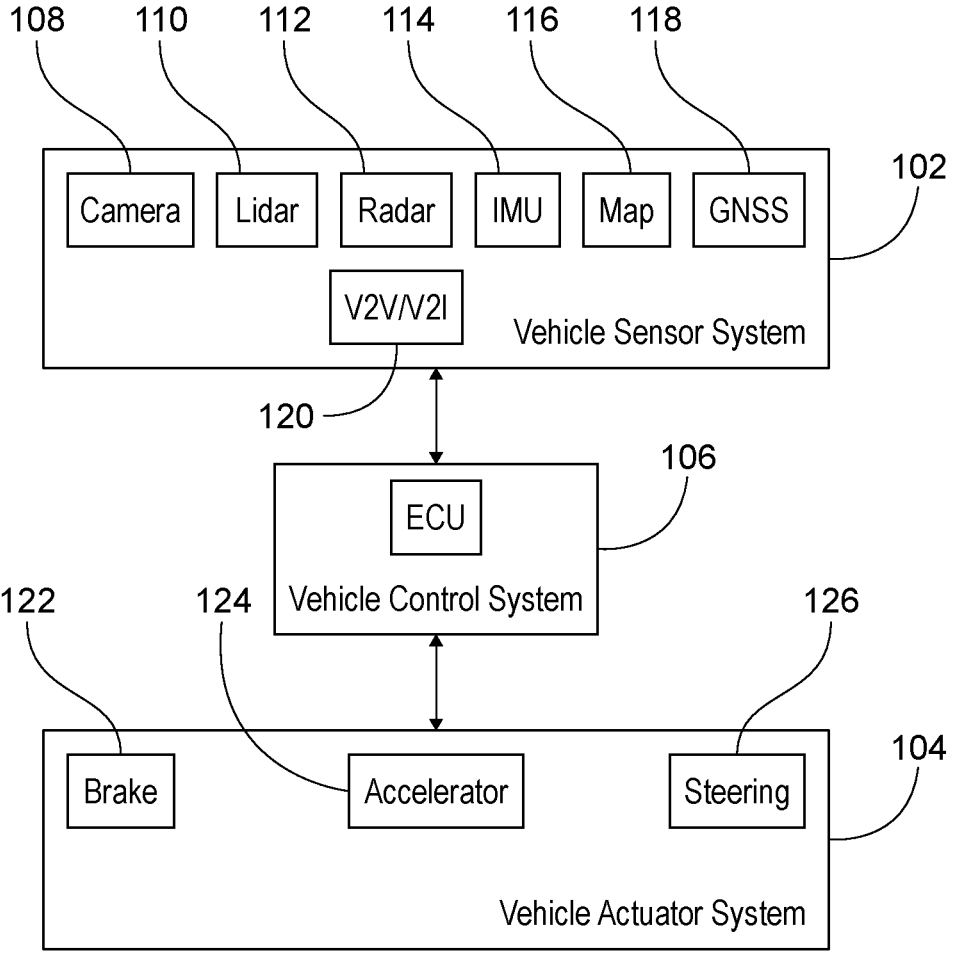
FIG. 2 is a block schematic illustrating exemplary components of the vehicle control system, the vehicle sensor system, and the vehicle actuator system.

Referring to FIGS. 1 and 2 of the present application, a vehicle 100 is shown to include a vehicle sensor system 102, a vehicle actuator system 104, and a vehicle control system 106. The vehicle control system 106 has an operable connection that facilitates computer communication to and with the vehicle sensor system 102 and the vehicle actuator system 104. The vehicle control system 106 controls the vehicle sensor system 102 to retrieve environmental information (e.g., information related to an environment surrounding the vehicle), and receives the environmental information as input data from the vehicle sensor system 102. The vehicle control system 106 also receives operation information related to operating parameters of the vehicle 100 from the vehicle actuator system 104, and may operate to control the vehicle actuator system based on either detected user inputs (e.g., via a steering wheel, accelerator, clutch and gear shift, etc.) As described in further detail below, the vehicle control system 106 performs processing on the environmental information received from the vehicle sensor system 102 and the operating parameters of the vehicle 100 received from the vehicle actuator system 104, as well as preset and/or user inputs, to determine control of the vehicle 100 and to control the vehicle actuator system 104 to perform the determined control of the vehicle 100.

The vehicle sensor system 102 may include any one or more sensors provide on or off the vehicle 100, which may be used to collect environmental information related to the environment in which the vehicle 100 is operating. For example, the vehicle sensor system 102 may include camera 108, a Lidar (Light Detection and Ranging) Device 110, a radar device 112, an inertial measurement unit (IMU) 114, a map database 116, a global navigation satellite system 118 (GNSS), and a vehicle-to-vehicle (V2V)/vehicle-to-infrastructure (V2I) system 120 that allows for communication with other vehicles and infrastructure support components.

The present application envisions that any and all of the components listed above as exemplary parts of the vehicle sensor system 102 may be included or omitted, in any combination. When included, the above components may be provided as a singular component or as a plurality of like components (e.g., the camera 108 may be provided as a plurality of cameras, the IMU 114 may be provided as a plurality of IMUs, etc.), situated and placed on any parts of the vehicle to facilitate the retrieval of the environmental information.

Additionally, the components of the vehicle sensor system 102 may be provided from known components configured to perform the functions known to be performed by the components. The components may be wholly embodied by devices which communicate with the vehicle control system 106, may be embodied by a device which requires processing either performed internally or by the vehicle control system 106, or may be entirely embodied by processing performed by the vehicle control system 106, e.g., based on information received by a vehicle receiver or transceiver (not shown) in communication with the vehicle control system 106. For example: the map database 116 may be stored in a memory in the vehicle control system 106; and the processing associated with the GNSS 118 and the V2V/V2I 120 may be performed by the vehicle control system 106 based on information received by the receiver or transceiver. Additionally, as will be clear with reference to the below discussion, the vehicle control system 106 performs processing on the environmental information data input from the vehicle sensor system 102 and uses the processed environmental information data to determine how to control the vehicle 100 via the vehicle actuator system 104.

The vehicle actuator system 104 includes a brake 122, an accelerator 124, and a steering 126. The brake 122 is used to stop the vehicle 100, for example by halting rotation of wheels of the vehicle 100. The accelerator 124 is used to make the vehicle 100 drive, for example, by causing drive wheel(s) of the vehicle 100 to rotate. The steering 126 is used to direct a trajectory of the vehicle 100, for example by turning wheels of the vehicle 100. The brake 122, the accelerator 124, and the steering 126 may be controlled by the user via user input mechanisms, e.g., a brake pedal, an accelerator pedal and a steering wheel or device. Alternatively, the brake 122, the accelerator 124, and the steering 126 may be controlled by the vehicle control system 106 to cause the vehicle to drive, stop, and turn. The brake 122, the accelerator 124, and the steering 126 are all known components of a vehicle and may be provided in any manner or configuration.

The vehicle control system 106 includes an electronic control unit (ECU) 128. The ECU 128 may be a vehicle ECU that controls and monitors any and all vehicle functions. The ECU 128 may be configured by one or more processors, together with a memory on which a control program is stored, so that the ECU 128 functions as described herein when the processor executes the control program. The ECU 128 may be part of the vehicle ECU or may be provided separately from the vehicle ECU via one or more processors or computers, with all or some of the functions being performed in the vehicle 100 or remote from the vehicle 100 with communication with the vehicle 100.

Within the context of the instant application, the ECU 128 is configured to receive inputs from the vehicle sensor system 102 and the vehicle actuator system 104, and to control the vehicle actuator system 104 based on processing those inputs. The control made by the ECU 128 may be in the context of an advanced driver assistance system (ADAS), in which the ECU 128 assists the user in driving the vehicle 100 (e.g., via a collision warning, steering, and braking system, among other known driver assistance systems), or in the context of autonomous driving of the vehicle 100, in which the ECU 128 controls driving and steering of the vehicle 100 without (or with minimal) user input).

In connection with controlling the vehicle 100 in either the ADAS or autonomous driving contexts (both may be described below with reference to "control" of the vehicle 100), the ECU 128 may control the vehicle in either a motion planning or a crash mitigation mode. The ECU 128 switches between these two modes based on an evaluation of an environment of the vehicle 100, specifically controlling the vehicle 100 in the crash mitigation mode when the vehicle 100 is determined to be operating in a high-risk environment and otherwise controlling the vehicle 100 in the motion planning mode. The goal of the motion planning mode is to have a high level of efficiency and comfort so that crash mitigation is never required. However, exogenous factors, such as the unexpected behavior of on-road vehicles, sensor failures, weathers conditions, etc., may place the vehicle 100 in the high-risk environment in which control in the motion planning mode is not feasible.

In such a case, the ECU 128 switches control to the crash mitigation mode, which has a goal of preventing collisions by performing evasive maneuvers or, if impossible, selecting a collision with a lowest estimated severity of collision. Stated briefly, the ECU 128 determines control of the vehicle 100 with an added emphasis on occupant comfort by setting an occupant parameter in a relatively higher motion planning range when operating in the motion planning mode, and determines control of the vehicle 100 with reduced emphasis on occupant comfort by setting the occupant parameter in a relatively lower crash mitigation range when operating in the crash mitigation mode.

It will be appreciated that the ECU 128 may generally operate in the motion planning mode and only switch to the crash mitigation mode in serious or threatening circumstances when the vehicle 100 is determined to be in the high-risk environment. Once the ECU 128 controls the vehicle 100 in the crash mitigation mode to remove the vehicle 100 from the high-risk environment, the ECU 128 returns control to the motion planning mode.

The ECU 128 provides an activation mechanism for smoothly switching from the motion planning mode to the crash mitigation mode, and then back to the motion planning mode. In this regard, conventional systems determine when to switch between a motion planning mode and a crash mitigation mode using either instantaneous or predictive risk evaluation strategies to determine the necessity of activating the crash mitigation mode. In terms of the instantaneous and predictive risk evaluation methods respectively, Gaussian overlap and time-to-collision (TTC) are commonly employed due to their simplicity and efficiency. However, these methods have only been deployed standalone in a fashion that runs the risk of constant switching between the motion planning mode and crash mitigation mode, adversely affecting passenger comfort as a result. Moreover, these risk evaluation methods deployed independently also run the risk of underestimating the risk in certain situations due to their underlying formulations.

To elaborate, consider the following two scenarios. In the first scenario, the vehicle 100 is traveling behind a leading vehicle with negligible headway and zero relative velocity. In this scenario, the predictive TTC is infinite as there is no difference in relative velocity and the vehicle trajectories suggest a collision is impossible. However, it will be appreciated that given the negligible headway, the risk of collision is high—if the leading vehicle suddenly brakes, it may likely lead to a crash. On the other hand, the instantaneous Gaussian overlap would recognize the high-risk of the scenario due to the close proximity of the vehicles.

In the second scenario, vehicle 100 is traveling behind the leading vehicle with considerable headway between the two vehicles. However, if the leading vehicle suddenly brakes (e.g., to a stop or near stop), the instantaneous Gaussian overlap may not identify the high-risk of the scenario until the two vehicles are in close proximity to each other, at which point more severe evasive actions may need to be taken or the crash may not be avoided. On the other hand, the predictive TTC would identify the high-risk of this scenario earlier due to consideration of the relative velocities.

To enjoy the benefits and avoid the drawbacks of the conventional systems which employ either of the instantaneous or predictive risk evaluation methods, the ECU 128 uses both instantaneous and predictive risk evaluation methods as part of the activation mechanism for determining when to switch between the motion planning mode and the crash mitigation mode.

Figure 3:
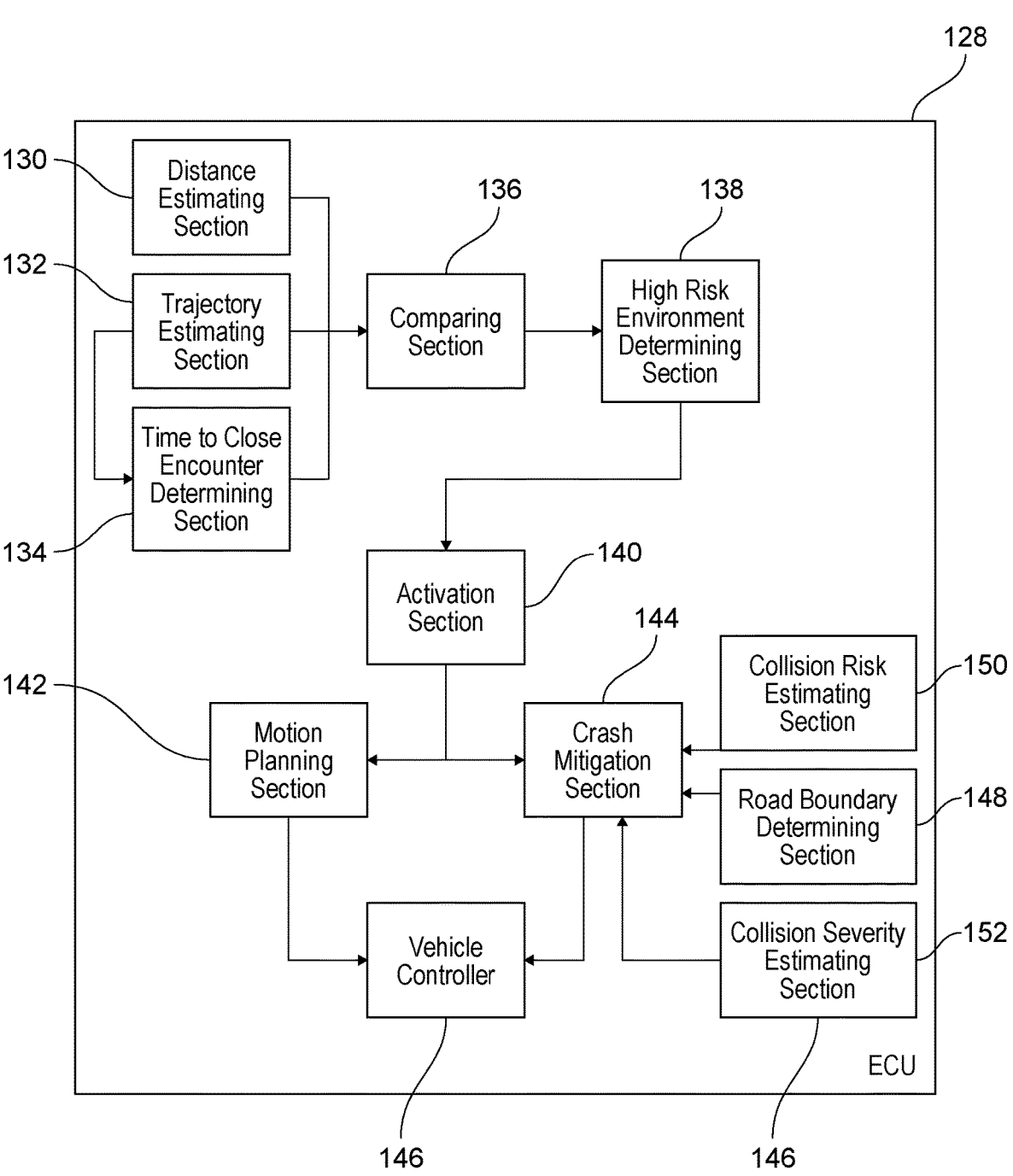
FIG. 3 is a block schematic illustrating exemplary components of the electronic control unit (ECU).

Referring to FIG. 3, the ECU 128 is programmed to perform various functions, described herein with reference to various "sections." The sections may be provided as part of a single programmed processor of the ECU 128, as separate processors within the ECU 128 or the vehicle 100, or via remote processors capable of communication with the ECU 128. Specifically, the ECU 128 includes a distance estimating section 130, a trajectory estimating section 132, a time-to-close-encounter (TTCE) determining section 134, a comparing section 136, a high-risk environment determining section 138, an activation section 140, a motion planning section 142, a crash mitigation section 144, a vehicle controller 146, a road boundary determining section 148, a collision risk estimating section 150, and a collision severity estimating section 152.

The distance estimating section 130 uses inputs from the vehicle sensor system 102 to estimate a distance between the vehicle 100 and a collision object (e.g., another vehicle). The trajectory estimating section 132 uses inputs from the vehicle sensor system 102 to estimate trajectories of the vehicle 100 and the collision object. The TTCE determining section 134 uses the estimated trajectories to determine a TTCE between the vehicle and the collision object.

Estimating the distance between the vehicle 100 and the collision object and estimating the trajectories of the vehicle 100 and the collision object may be performed using any known methods or algorithms. Notably, the vehicle sensor system 102 uses the various sensors to identify a position and size/shape of the vehicle 100 and any possible collision objects (e.g., other vehicles), as well as a motion state/trajectory of the vehicle 100 and any possible collision objects. Based on these identifications, the distance and TTCE between the vehicle 100 and any collision objects may be estimated. It is also noted that the while the instant description references a singular collision object, the ECU 128 may perform processing for any and all possible collision objects surrounding the vehicle 100, including other vehicles, pedestrians, obstacles along a road boundary, etc., It is to be understood that the description hereinbelow with reference to one collision object is performed for all possible collision objects.

Exemplarily, the instantaneous risk, denoted by $\kappa(k)$, associated with the proximity of vehicle 100 and the collision object may be modeled as the area of overlap for bivariate Gaussian distributions in which the means corresponds to the position of the vehicles while the covariance matrices are determined by the length, width, and orientation of the vehicles as follows:

$$\sum_{i}(k) = R_{\theta_i(k)} \begin{bmatrix} \beta_l W_i & 0 \\ 0 & \beta_w W_i \end{bmatrix} R_{\theta_i(k)}^T \tag{1}$$

where $L_i$ and $W_i$ define the length and width of vehicle i, with $\beta_l$ and $\beta_w$ corresponding to respective scaling factors, and $R_{\theta i(k)}$ representing the 2D rotation matrix with the rotation angle $\theta_i(k)$.

For the predictive risk, $\tau(k)$, TTCE may be evaluated based on longitudinal and lateral displacement between vehicles. As used herein, a "close encounter" may be an actual collision or a situation in which the vehicle 100 and the collision object are sufficiently close as to warrant a very near miss of a collision. Exemplarily, the TTCE, as $T_i$, is formulated based on the relative velocity between the vehicle 100 and the collision object, noted as vehicle i, as follows:

$$\tau(k) = \max_{i \in 0(k)} \frac{1}{\tau_i(k)} \tag{2}$$

$$\tau_i(k) = \frac{\|\overline{p}_i(k)\| \cos(\partial_i(k))}{\|\overline{v}_i(k)\|} = \frac{\overline{p}_i(k) \cdot \overline{v}_i(k)}{\|\overline{v}_i(k)\|^2} \tag{3}$$

where $\overline{p}_i(k) = p_i(k) - p_0(k)$ and $\overline{v}_i(k)$ correspond respectively to the relative displacement and velocity between the vehicle 100 and vehicle i, while the second equality in equation (5) follows from the fact that:

$$\overline{p}_i(k) \cdot \overline{v}_i(k) = \|\overline{p}_i(k)\| \|\overline{v}_i(k)\| \cos(\partial_i(k)). \tag{4}$$

The comparing section 136 compares the estimated distance between the vehicle 100 and the collision object with a first predetermined distance and a second predetermined distance, and compares the determined TTCE with a first predetermined TTCE and a second predetermined TTCE. The first predetermined distance and the first predetermined TTCE may be set based on experimentation or modeling as a distance and TTCE in which a threat to the vehicle 100 and/or its occupants is sufficiently high as to warrant automated control of the vehicle 100 by the ECU 128 by switching control of the vehicle from the motion planning mode to the crash mitigation mode. The second predetermined distance and the second predetermined TTCE may be set based on experimentation or modeling as a distance and TTCE in which a threat to the vehicle 100 and/or its occupants has been sufficiently abated in the crash mitigation mode as to allow return of control of the vehicle to the motion planning mode without significant risk of immediate return to the crash mitigation mode. To effect these goals, the second predetermined distance and the second predetermined TTCE are set higher than the first predetermined distance and the first predetermined TTCE.

The high-risk environment determining section 138 determines that the vehicle 100 is in the high-risk environment based on the comparison performed by the comparator 136. Specifically, when the ECU 128 is controlling the vehicle 100 in the motion planning mode and either of the estimated distance between the vehicle 100 and the collision object is less than the first predetermined distance or the determined TTCE between the vehicle 100 and the collision object is less than the first predetermined TTCE, the high-risk environment determining section 138 determines that the vehicle 100 is in the high-risk environment.

The high-risk environment determining section 138 determines that the vehicle 100 is not in the high-risk environment based on the comparison performed by the comparator 136. Specifically, when the ECU 128 is controlling the vehicle 100 in the crash mitigation mode and the one or both of the estimated distance between the vehicle and the collision object and/or the determined TTCE between the vehicle 100 and the collision object which had triggered the identification of the high-risk environment based on being below the respective first predetermined distance and the first predetermined TTCE, changes to become greater than the second predetermined distance and/or the second predetermined TTCE, the high-risk environment determining section 138 determines the vehicle 100 is not (no longer) in the high-risk environment. To clarify, when the ECU 128 switches control from the motion planning mode to the crash mitigation mode due to the estimated distance between the vehicle 100 and the collision object being less than the first predetermined distance, then the high-risk environment determining section 138 determines the vehicle 100 is not in (has left) the high-risk environment when the estimated distance between the vehicle 100 and the collision object becomes greater than the second predetermined distance. When the ECU 128 switches control from the motion planning mode to the crash mitigation mode due to the determined TTCE between the vehicle 100 and the collision object being less than the first predetermined TTCE, then the high-risk environment determining section 138 determines the vehicle 100 is not in (has left) the high-risk environment when the determined TTCE between the vehicle 100 and the collision object becomes greater than the second predetermined TTCE.

The activation section 140 receives the input of whether the vehicle 100 is in the high-risk environment and activates control by the ECU 128 in either the motion planning mode, controlled by the motion planning section 142, or the crash mitigation mode, controlled by the crash mitigation section 144. Specifically, when the high-risk environment determining section 138 determines the vehicle 100 is not in the high-risk environment, the activation section 140 activates control by the ECU 128 in the motion planning mode via the motion planning section 142. When the high-risk environment determining section 138 determines the vehicle 100 is in the high-risk environment, the activation section 140 activates control by the ECU 128 in the crash mitigation mode via the crash mitigation section 144. The activated one of the motion planning section 142 or the crash mitigation section 144 then controls and sends instructions to the vehicle controller 146, which outputs instructions and controls the vehicle actuator system 104 to cause the vehicle to maintain or adjust a braking power (via the brake 122), a throttle (via the accelerator 124), and a trajectory (via the steering 126).

The speed and trajectory planning associated with the ECU 128 control of the vehicle 100 is described in further detail below. For now, it is again noted that in the motion planning mode via the motion planning section 142, the occupant comfort parameter is relatively emphasized (i.e., made higher in the motion planning range) as compared to the crash mitigation mode via the crash mitigation section 144 (i.e., where the occupant comfort parameter is made lower in the crash mitigation range). The rationale behind this shift is that as the risk increases, the importance of passenger comfort decreases. In other words, where abrupt acceleration, deceleration, and steering may be uncomfortable to the occupant when driving in an environment (i.e., in the motion planning mode when not in the high-risk environment), the lack of comfort is less important when driving in the high-risk environment since avoiding collision or minimizing the severity of collisions is more important.

Figure 4:
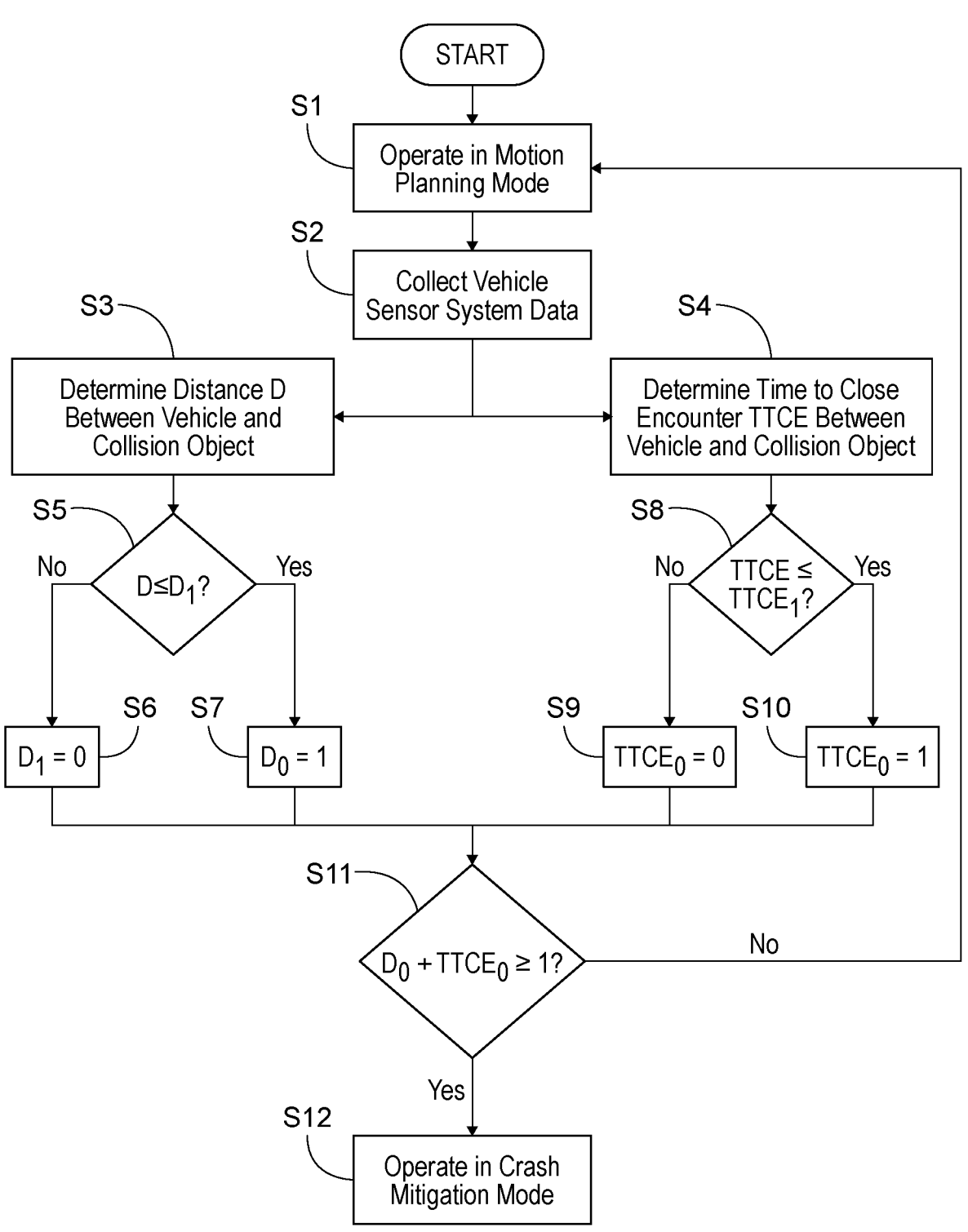
FIG. 4 is a flow chart illustrating a process for switching vehicle control from a motion planning mode to a crash mitigation mode.

Before addressing the trajectory planning by the ECU 128, the method and system for switching control between the motion planning mode and the crash mitigation mode will be described with reference to FIG. 4. Beginning with the ECU 128 controlling the vehicle 100 in the motion planning mode (S1), the vehicle sensor system 102 and the ECU 128 of the vehicle control system 106 collect data from the vehicle sensor system 102 (S2). Using the collected data, the distance D between the vehicle 100 and the collision object is determined (S3) using the distance estimating section 130 and the TTCE between the vehicle 100 and the collision object is determined (S4) using the trajectory estimating section 132 and the TTCE determining section 134.

Then, the estimated distance D is compared to the first predetermined distance $D_1$ (S5) to determine if the estimated distance D is less than the first predetermined distance $D_1$. If the estimated distance D is not less than or equal to the first predetermined distance $D_1$, it is determined that the vehicle 100 is not in the high-risk environment based on the instantaneous risk evaluation and the distance marker $D_0$ is set to equal 0 (S6). If the estimated distance D is less than or equal to the first predetermined distance $D_1$, it is determined that the vehicle 100 is in the high-risk environment based on the instantaneous risk evaluation and the distance marker $D_0$ is set to equal 1 (S7).

Also, the determined TTCE is compared to the first predetermined $TTCE_1$ (S8) to determine if the determined TTCE is less than the first predetermined $TTCE_1$. If the determined TTCE is not less than or equal to the first predetermined $TTCE_1$, it is determined that the vehicle 100 is not in the high-risk environment based on the predictive risk evaluation and the TTCE marker $TTCE_0$ is set to equal 0 (S9). If the determined TTCE is less than or equal to the first predetermined $TTCE_1$, it is determined that the vehicle 100 is in the high-risk environment based on the predictive risk evaluation and the TTCE marker $TTCE_0$ is set to equal 1 (S10).

The comparing section 136 and the high-risk environment determining section 138 then determine if the vehicle is in the high-risk environment (S11) by, e.g., adding the distance marker $D_0$ and the TTCE marker $TTCE_0$ to see if either is set equal to 1. If the sum is greater than or equal to 1, then the vehicle 100 has been determined to be in the high-risk environment based on at least one of the instantaneous and predictive risk evaluations and the method proceeds to use the activation section 140 to switch control to the crash mitigation mode via the crash mitigation section 144 (S12). If the sum equals 0, then the vehicle 100 has not been determined to be in the high-risk environment based on either of the instantaneous and predictive risk evaluations, and control remains in the motion planning mode via the motion planning section (return to S1).

Once the ECU 128 is controlling the vehicle 100 in the crash mitigation mode via the crash mitigation section 144, the vehicle 100 may be controlled to carry out evasive maneuvers so as to remove the vehicle from the high-risk environment. To switch the ECU 128 from controlling the vehicle 100 in the crash mitigation mode to the motion planning mode, a hysteresis band is used whereby the threshold for the estimated distance D and the determined TTCE is higher than for switching the ECU 128 control to the crash mitigation mode. This prevents the ECU 128 from rapidly switching control between the crash mitigation mode and the motion planning mode, and allows the ECU 128 to securely remove the vehicle 100 from the high-risk environment before returning control to the motion planning mode.

Figure 5:
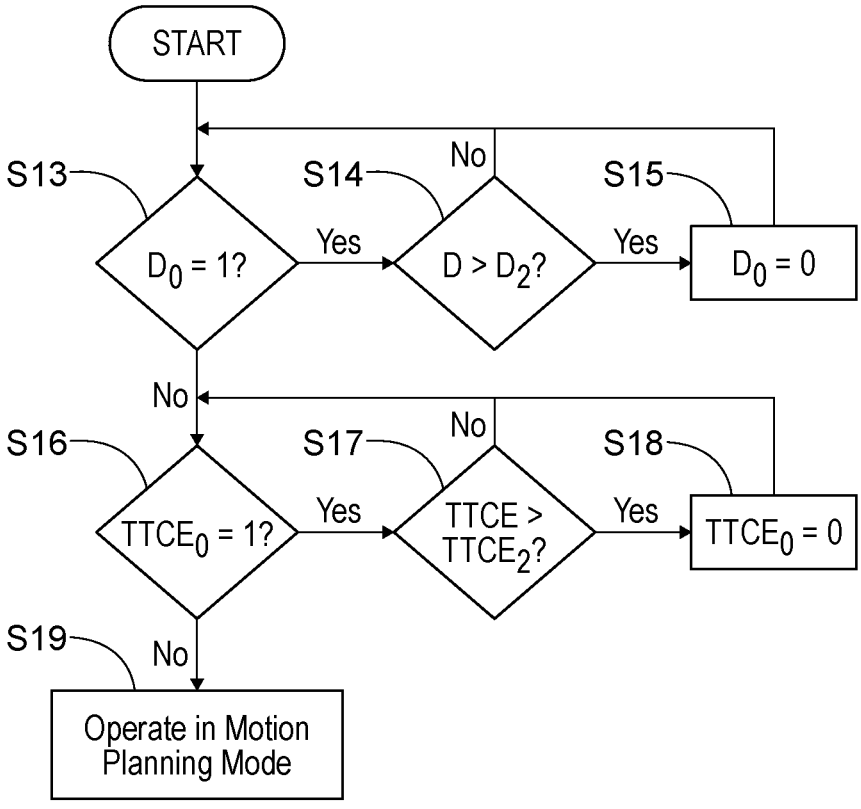
FIG. 5 is a flow chart illustrating a process for switching vehicle control from the crash mitigation mode to the motion planning mode.

FIG. 5 shows a method for returning control from the crash mitigation mode to the motion planning mode. Beginning with control in the crash mitigation mode while collecting data from the vehicle sensor system 102, the ECU 128 continues to use the distance estimating section 130, the trajectory estimating section 132, and the TTCE determining section 134 to estimate the distance D and determine the TTCE.

Then, it is determined whether the crash mitigation mode was entered due to the instantaneous risk evaluation based on distance and/or the predictive risk evaluation based on trajectories. Specifically, it is assessed whether the distance marker $D_0=1$ (S13). If so, it is then assessed whether the estimated distance D becomes greater than the second predetermined distance $D_2$ (S14). If the estimated distance D is greater than the second predetermined distance $D_2$, then the distance marker $D_0$ is set equal to 0. Otherwise, monitoring of the estimated distance D and comparison to the second predetermined distance $D_2$ is continued (No at S14 returns to S13).

When the distance marker $D_0$ is not equal to 1, the method continues to assess whether the TTCE marker $TTCE_0=1$ (S16). If so, it is then assessed whether the determined TTCE becomes greater than the second predetermined $TTCE_2$ (S117). If the determined TTCE is greater than the second predetermined $TTCE_2$, then the TTCE marker $TTCE_0$ is set equal to 0. Otherwise, monitoring of the determined TTCE and comparison to the second predetermined $TTCE_2$ is continued (No at S17 returns to S16).

When both the distance mark $D_0$ and the TTCE marker $TTCE_0$ are equal to zero (No at S13 and S16), the method continues to cause the ECU 128 to return control to the motion planning mode via the motion planning section 142.

By this method, if the high-risk environment is based on the instantaneous risk evaluation based on the estimated distance between the vehicle 100 and the collision object, control is switched from the crash mitigation mode to the motion planning mode only when the estimated distance is made to exceed the second predetermined distance, which is greater than the first predetermined distance which triggers control to switch from the motion planning mode to the crash mitigation mode. If the high-risk environment is based on the predictive risk evaluation based on the determined TTCE between the vehicle 100 and the collision object, control is switched from the crash mitigation mode to the motion planning mode only when the determined TTCE is made to exceed the second predetermined TTCE, which is greater than the first predetermined TTCE which triggers control to switch from the motion planning mode to the crash mitigation mode. If the high-risk environment is based on the instantaneous risk evaluation and the predictive risk evaluation, then both the estimated distance and the determined TTCE would need to exceed the second predetermined distance and the second predetermined TTCE, respectively. Until the parameters exceed the second predetermined thresholds, control remains in the crash mitigation mode (S23, No, return to S13).

Once the ECU 128 is controlling the vehicle 100 in the crash mitigation mode, a receding horizon optimization is used to minimize a situational risk profile while accounting for vehicle dynamics, actuator limits, and road boundaries. To simplify the discussion below, the collision object may be assumed to be another vehicle. To quantify the spatially distributed situational risk perceived by the vehicle 100 at time instant k, the instantaneous risk function $\rho(k)$ is formulated as an aggregate of individual agent-specific risk functions $\rho i(k)$, for each $i \in O(k)$ (where $O(k)$ represents the set of vehicles visible to the vehicle 100), as well as road boundary risk $\rho r(k)$, with parametric continuous smooth functions to model $\rho(k)$. In particular, taking inspiration from a skewed Gaussian distribution, a skewed hyperbolic quadratic function is formulated to represent $\rho i(k)$, and $\rho r(k)$ is modeled with a univariate Gaussian function. Before expanding on the functional form for $\rho i(k)$, it is noted that the density function $\phi s(ps)$ of a skewed Gaussian distribution is shown below:

$$\phi_s(p_s) = 2\phi\left(p_s; \mu_s, \sum\nolimits_s\right)\Phi\left(q_s^T p_s\right) \tag{5}$$

where $p_s \in R^2$ and $q_s \in R^2$ (R being the set of real numbers) correspond respectively to position and direction-oriented skew parameters in the Cartesian coordinate frame while $\phi$ and $\Phi$ represent the density and distribution functions of a bivariate Gaussian distribution parametrized by mean $\mu_s$ and covariance $\Sigma_s$.

To obtain a situational risk profile with its spatial density similar to that of a Gaussian mixture while ensuring that each agent has a surrounding barrier that prevents the vehicle 100 from going through it, a reciprocal quadratic function $\psi i$ is used instead of $\phi$. Moreover, to orient and scale the symmetric risk distribution in the direction of an agent's motion, a simpler Sigmoid function $\sigma_i$ is used instead of $\phi$, which requires the evaluation the error function. Then, having, $\bar{p}(k)=\{\bar{p}_i(k)|i \in O(k)\}$, $\rho(k)$ situational risk $\rho(k)$ is given by:

$$\rho(k; \overline{p}(k)) = \sum_{i \in O(k)} \rho_i(k; \overline{p}_i(k)) + p_r(k) \tag{6}$$

$$\rho_i(k; \overline{p}_i(k)) = \psi_i(k; \overline{p}_i(k))\sigma_i(k; \overline{p}_i(k)) \tag{7}$$

$$\psi_i(k; \overline{p}_i(k)) = \frac{\overline{\eta}_i(k)}{\alpha_g + \overline{p}_i^T(k)\sum\nolimits_i^{-1}(k)\overline{p}_i(k)} \tag{8}$$

-continued $$\sigma_i(k; \overline{p}_i(k)) = \frac{1}{1 + \exp(-\alpha_g \overline{p}_i^T(k)v_i(k))} \quad (9)$$

$$\rho_r(k) = \gamma_r \exp(-\alpha_r \overline{p}_r^T(k)\Gamma(k)\overline{p}_r(k)) \quad (10)$$

where $\alpha_g$ controls the relative gradient of the agent distribution, $\alpha_s$ controls skewness of the agent distribution, $\overline{\eta}_i(k)$ is a normalizing/scaling factor, $\Sigma_i(k)$ is defined analogously to $\Sigma_i(k)$ in (1) but the distinction is made since the scaling and rotation parameters need not be the same, $\gamma_r$ controls the scaling for road distribution, $\alpha_r$ controls the gradient for road distribution, $\overline{p}_r(k) = p_r(k) - p_0(k)$, with $p_r(k) \in \Re(k)$, denotes the relative coordinates of the road boundary, and $\Gamma(k)$, with the help of Frenet coordinates system, ensures that the road risk is effective in only the lateral direction.

To avoid making assumptions about the nature of neighboring agents as it may lead to degraded overall behavior, a constant acceleration prediction model is used. Making assumptions about the behavior of agents, such as attributing aggressive (adversarial) or defensive (cooperative) intent to them, increases the risk of misjudging the true nature of the agent's behavior in such stressful scenarios. This may lead to undesirable outcomes, such as focusing on minimizing the severity of a crash but ultimately causing the crash when it was actually avoidable or opting for a collision avoidance strategy but eventually increasing crash severity when it was indeed unavoidable.

In practice, most high-risk situations result from human drivers' negligence, which justifies the use of this simple behavior-agnostic prediction model formalized below:

$$x_i^k(j+1) = x_i^k(j) + T_s v_i^k(j) \cos(\theta_i(k)) \quad (11)$$

$$y_i^k(j+1) = y_i^k(j) + T_s v_i^k(j) \sin(\theta_i(k)) \quad (12)$$

$$v_i^k(j+1) = v_i^k(j) + T_s a_i(k) \quad (13)$$

where $\theta_i(k)$ and $a_i(k)$ are the estimated heading and acceleration of the vehicle i, $x^k_i(j)$, $y^k_i(j)$ and $v^k_i(j)$ are the predicted x-coordinate, y-coordinate, and speed values of the vehicle 100 i at a future time step j with $x^k_i(0) = x_i(k)$, $y^k_i(0) = y_i(k)$, and $v^k_i(0) = v_i(k)$. Then, the relative predicted position is denoted by $$\overline{p}_i^k(j) = [x_i^k(j)u_i^k(j)]^T - p_o(k) \text{ and } \overline{p}^k(j) = \{\overline{p}_i^k(j) \mid i \in \mathbb{O}(k)\}.$$

The below objective function is formulated to minimize the accumulative predictive situational risk, defined in (6), over the planning horizon H while placing relatively low emphasis on control action regulation.

$$J(k) = \sum_{j=1}^{H} \rho^k(j; p^k(j)) + U^{k^T}(j)R(k)U^k(j) \quad (14)$$

where R(k), chosen such that max $U^{KT}(j)R(k)U^k(j) \ll$ max $\rho^k(j)$, places a time-varying penalty on control actions which in turn ensures passenger comfort. R(k) is allowed to be time varying so that its value is set inversely proportional to the sum of normalized instantaneous and predictive collision avoidance risks, as shown below:

$$\frac{1}{R(K)} \propto \frac{2\kappa}{\kappa_a + \kappa_d} + \frac{2\tau}{\tau_a + \tau_d} \quad (15)$$

This ensures that the emphasis on control action minimization (or passenger comfort) is further decreased with an increased risk of collision with other agents. With returning reference to the above discussion, the R(k) is the occupant comfort parameter which rises with a decrease in a risk of collision and falls with an increase in the risk of collision. Moreover, experimental or analytical modeling may be used to determine motion planning and crash mitigation mode ranges for this occupant comfort parameter, where the motion planning range is higher than the crash mitigation range.

Continuing, the receding horizon optimization problem is posed as a nonlinear program with its formulation provided below:

$$\min_{X^k, U^k} J(k) \quad (16)$$

subject to:

$$X^k(0) = X(k)$$

$$X^k(j+1) = f(X^k(j), U^k(j)) \quad \forall j \in \mathbb{Z}_{[0,H-1]},$$

$$X^k(j) \in \mathbb{X}(k) \quad \forall j \in \mathbb{Z}_{[0,H-1]},$$

$$U^k(j) \in \mathbb{U}(k) \quad \forall j \in \mathbb{Z}_{[0,H-1]},$$

where $X^k = \{X^k(j) \mid j \in Z_{[0, H]}\}$ and $U^k = \{U^k(j) \mid j \in Z_{[0,H-1]}\}$, respectively representing the future states and controls, denote the optimization variables, with Z denoting the set of integers.

In the above, it is noted that equation (7) represents a risk associated with the vehicle 100 colliding with collision objects, such as other vehicles. Equation (10) represents the risk associated with the road boundary. In this regard, when operating in the crash mitigation mode, the ECU 128 may use input data from the vehicle sensor system 102, via the road boundary determining section 148, to locate and determine a road boundary, which is a boundary of a road on which the vehicle 100 is traveling. The ECU 128 may further use the input data to assess a risk of collision, which is a risk of collision with the collision object, using the collision risk estimating section 150. The ECU 128 may further use the input data to assess the severity of collision, using the collision severity estimating section 152. The road boundary, the risk of collision, and the severity of collision may be determined and/or estimated in view of the above formulations and methodology and/or using other known techniques and methods while remaining within the scope of the instant disclosure.

Among other features, the above formulations and methodology consider that at a certain point, the risk of collision may reach some predetermined unavoidable collision risk at which it is determined that the likelihood of avoiding collision with the collision object is very low without leaving the road boundary. The unavoidable collision risk may be predetermined experimentally or modeled, for example, based on the above formulations.

In the scenario in which the risk of collision reaches the predetermined unavoidable collision risk, where it is possible to leave the road boundary to avoid the collision, the ECU 128 via the crash mitigation section 144 may control the vehicle 100 to leave the road boundary to thereby avoid the collision. Where it is not possible to leave the road boundary to avoid the collision, the ECU 128 via the crash mitigation section 144 and the collision severity estimating section 152 may evaluate a second collision object, which may be another vehicle, a pedestrian, part of the road boundary, etc., and make an assessment of a severity of collision for each of the collision object and the second collision object. It is to be appreciated that this assessment is made for all possible second collision objects (e.g., multiple vehicles and road boundary fixtures may be assessed as the second collision object), though referenced herein as a singular second collision object.

The severity of collision is assessed by the collision severity estimating section 152 in consideration of evasive maneuvers which may be carried out by the vehicle 100, such as braking and steering, and may be based on relatively simple parameters, such as relative velocities, or more complicated parameters related to the second collision object, such as the identification of rigid structures (bridge columns, stores, etc.) as the collision object and/or collision object size and hardness (among other parameters). The ECU 128 via the crash mitigation section 144 may then control the vehicle 100 to collide with the collision object or the second collision object that has a lowest estimated severity of collision.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling a vehicle, comprising:
determining whether a distance between the vehicle and a collision object is less than a first predetermined distance based on estimated positions of the vehicle and the collision object;
determining whether a time to close encounter between the vehicle and the collision object is less than a first predetermined time to close encounter based on estimated trajectories of the vehicle and the collision object;
determining that the vehicle is operating in a high-risk environment when at least one of:
(i) the distance is less than the first predetermined distance; or
(ii) the time to close encounter is less than the first predetermined time to close encounter;
when the vehicle is determined to be operating in the high-risk environment, controlling the vehicle in a crash mitigation mode by generating vehicle control commands using an occupant comfort parameter within a crash mitigation range of the occupant comfort parameter; and
when the vehicle is not determined to be operating in the high-risk environment, controlling the vehicle in a motion planning mode by generating vehicle control commands using the occupant comfort parameter within a motion planning range, the motion planning range of the occupant comfort parameter being higher than the crash mitigation range of the occupant comfort parameter,
wherein the occupant comfort parameter is used to set an allowable degree of change of acceleration, deceleration, and steering of the vehicle in generating the vehicle control commands, where the allowable degree of change of acceleration, deceleration, and steering of the vehicle is proportionally reduced as the occupant comfort parameter increases, and the allowable degree of change of acceleration, deceleration, and steering of the vehicle is proportionally increased as the occupant comfort parameter decreases.

2. The method according to claim 1, further comprising:
estimating a risk of collision with the collision object and increasing the occupant comfort parameter as the risk of collision decreases and decreasing the occupant comfort parameter as the risk of collision increases.

3. The method according to claim 1, further comprising:
while controlling the vehicle in the crash mitigation mode after the vehicle is determined to be operating in the high-risk environment, switching control of the vehicle to the motion planning mode when:
when the vehicle is determined to be operating in the high-risk environment due to the distance being less than the first predetermined difference, the distance changes to be greater than a second predetermined distance, the second predetermined distance being greater than the first predetermined distance;
when the vehicle is determined to be operating in the high-risk environment due to the time to close encounter being less than the first predetermined time to close encounter, the time to close encounter changes to be greater than a second predetermined time to close encounter, the second predetermined time to close encounter being greater than the first predetermined time to close encounter; and
when the vehicle is determined to be operating in the high-risk environment due to the distance being less than the first predetermined difference and due to the time to close encounter being less than the first predetermined time to close encounter, the distance changes to be greater than the second predetermined distance and the time to close encounter changes to be greater than the second predetermined time to close encounter.

4. The method according to claim 1, further comprising:
determining positions of a road boundary; and
while controlling the vehicle in the crash mitigation mode after the vehicle is determined to be operating in the high-risk environment,
estimating a risk of collision with the collision object, and
when the risk of collision with the collision object exceeds a predetermined unavoidable collision risk, controlling the vehicle to leave the road boundary to avoid the collision within the road boundary.

5. The method according to claim 3, further comprising:
determining positions of a road boundary; and
while controlling the vehicle in the crash mitigation mode after the vehicle is determined to be operating in the high-risk environment,
estimating a risk of collision with the collision object, and
when the risk of collision with the collision object exceeds a predetermined unavoidable collision risk, controlling the vehicle to leave the road boundary to avoid the collision within the road boundary.

6. The method according to claim 1, further comprising:

while controlling the vehicle in the crash mitigation mode after the vehicle is determined to be operating in the high-risk environment, estimating a risk of collision with the collision object and a second collision object, and when the risk of collision with the collision object exceeds a predetermined unavoidable collision risk, estimating a severity of collision with the collision object and with the second collision object, and controlling the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

7. The method according to claim 3, further comprising:

while controlling the vehicle in the crash mitigation mode after the vehicle is determined to be operating in the high-risk environment, estimating a risk of collision with the collision object and a second collision object, and when the risk of collision with the collision object exceeds a predetermined unavoidable collision risk, estimating a severity of collision with the collision object and with the second collision object, and controlling the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

8. The method according to claim 1, further comprising:

determining positions of a road boundary; and while controlling the vehicle in the crash mitigation mode after the vehicle is determined to be operating in the high-risk environment, estimating a risk of collision with the collision object and a second collision object, and when the risk of collision with the collision object and the second collision object exceeds a predetermined unavoidable collision risk, controlling the vehicle to leave the road boundary to avoid the collision within the road boundary when leaving the road boundary would avoid collision with the collision object and the second collision object, and when the risk of collision with the collision object and the second collision object exceeds the predetermined unavoidable collision risk, estimating a severity of collision with the collision object and with the second collision object, and controlling the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

9. The method according to claim 3, further comprising:

determining positions of a road boundary; and while controlling the vehicle in the crash mitigation mode after the vehicle is determined to be operating in the high-risk environment, estimating a risk of collision with the collision object and a second collision object, and when the risk of collision with the collision object and the second collision object exceeds a predetermined unavoidable collision risk, controlling the vehicle to leave the road boundary to avoid the collision within the road boundary when leaving the road boundary would avoid collision with the collision object and the second collision object, and when the risk of collision with the collision object and the second collision object exceeds the predetermined unavoidable collision risk, estimating a severity of collision with the collision object and with the second collision object, and controlling the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

10. A vehicle control system provided in a vehicle, comprising a vehicle electronic control unit in communication with a vehicle sensor system and a vehicle actuator system, the electronic control unit being programmed to:

estimate a distance between the vehicle and a collision object based on input from the vehicle sensor system;

estimate trajectories of the vehicle and the collision object based on input from the vehicle sensor system;

determine a time to close encounter between the vehicle and the collision object based on the estimated trajectories;

determine whether the distance is less than a first predetermined distance;

determine whether the time to close encounter is less than a first predetermined time to close encounter;

determine that the vehicle is operating in a high-risk environment when at least one of:

(i) the distance is less than the first predetermined distance; or (ii) the time to close encounter is less than the first predetermined time to close encounter;

when the vehicle is determined to be operating in the high-risk environment, controlling the vehicle actuator system to control the vehicle in a crash mitigation mode by generating vehicle control commands using an occupant comfort parameter within a crash mitigation range of the occupant comfort parameter; and when the vehicle is not determined to be operating in the high-risk environment, controlling the vehicle actuator system to control the vehicle in a motion planning mode by generating vehicle control commands using the occupant comfort parameter within a motion planning range of the occupant comfort parameter, the motion planning range of the occupant comfort parameter being higher than the crash mitigation range of the occupant comfort parameter, wherein the occupant comfort parameter is used to set an allowable degree of change of acceleration, deceleration, and steering of the vehicle in generating the vehicle control commands, where the allowable degree of change of acceleration, deceleration, and steering of the vehicle is proportionally reduced as the occupant comfort parameter increases, and the allowable degree of change of acceleration, deceleration, and steering of the vehicle is proportionally increased as the occupant comfort parameter decreases.

11. The vehicle control system according to claim 10, wherein the electronic control unit is further programmed to:
estimate a risk of collision with the collision object and increase the occupant comfort parameter as the risk of collision decreases and decrease the occupant comfort parameter as the risk of collision increases.

12. The vehicle control system according to claim 10, wherein the electronic control unit is further programmed to:
while controlling the vehicle actuator system in the crash mitigation mode after the vehicle is determined to be operating in the high-risk environment, switching control of the vehicle actuator system to the motion planning mode when:
when the vehicle is determined to be operating in the high-risk environment due to the distance being less than the first predetermined difference, the distance changes to be greater than a second predetermined distance, the second predetermined distance being greater than the first predetermined distance;
when the vehicle is determined to be operating in the high-risk environment due to the time to close encounter being less than the first predetermined time to close encounter, the time to close encounter changes to be greater than a second predetermined time to close encounter, the second predetermined time to close encounter being greater than the first predetermined time to close encounter; and
when the vehicle is determined to be operating in the high-risk environment due to the distance being less than the first predetermined difference and due to the time to close encounter being less than the first predetermined time to close encounter, the distance changes to be greater than the second predetermined distance and the time to close encounter changes to be greater than the second predetermined time to close encounter.

13. The vehicle control system according to claim 10, wherein the electronic control unit is further programmed to:
determine positions of a road boundary based on input from the vehicle sensor system; and
while controlling the vehicle in the crash mitigation mode after the vehicle is determined to be operating in the high-risk environment,
estimate a risk of collision with the collision object based on input from the vehicle sensor system, and
when the risk of collision with the collision object exceeds a predetermined unavoidable collision risk, control the vehicle actuator system to cause the vehicle to leave the road boundary to avoid the collision within the road boundary.

14. The vehicle control system according to claim 12, wherein the electronic control unit is further programmed to:
determine positions of a road boundary based on input from the vehicle sensor system; and
while controlling the vehicle actuator system in the crash mitigation mode after the vehicle is determined to be operating in the high-risk environment,
estimate a risk of collision with the collision object based on input from the vehicle sensor system, and
when the risk of collision with the collision object exceeds a predetermined unavoidable collision risk, control the vehicle actuator system to cause the vehicle to leave the road boundary to avoid the collision within the road boundary.

15. The vehicle control system according to claim 10, wherein the electronic control unit is further programmed to:
while controlling the vehicle in the crash mitigation mode after the vehicle is determined to be operating in the high-risk environment,
estimate a risk of collision with the collision object and a second collision object based on input from the vehicle sensor system, and
when the risk of collision with the collision object exceeds a predetermined unavoidable collision risk, estimate a severity of collision with the collision object and with the second collision object based on input from the vehicle sensor system, and control the vehicle actuator system to cause the vehicle to collide with the collision object or the second collision object having a lower estimated severity of collision,
wherein the severity of collision is estimated to be higher: as a relative velocity increases between the vehicle and the collision object, and between the vehicle and the second collision object; and when the collision object or the second collision object is identified as a rigid structure.

16. The vehicle control system according to claim 12, wherein the electronic control unit is further programmed to:
while controlling the vehicle in the crash mitigation mode after the vehicle is determined to be operating in the high-risk environment,
estimate a risk of collision with the collision object and a second collision object based on input from the vehicle sensor system, and
when the risk of collision with the collision object exceeds a predetermined unavoidable collision risk, estimate a severity of collision with the collision object and with the second collision object based on input from the vehicle sensor system, and control the vehicle actuator system to cause the vehicle to collide with the collision object or the second collision object having a lower estimated severity of collision,
wherein the severity of collision is estimated to be higher: as a relative velocity increases between the vehicle and the collision object, and between the vehicle and the second collision object; and when the collision object or the second collision object is identified as a rigid structure.

17. The vehicle control system according to claim 10, wherein the electronic control unit is further programmed to:
determine positions of a road boundary based on input from the vehicle sensor system; and
while controlling the vehicle in the crash mitigation mode after the vehicle is determined to be operating in the high-risk environment,
estimate a risk of collision with the collision object and a second collision object based on input from the vehicle sensor system, and
when the risk of collision with the collision object and the second collision object exceeds a predetermined unavoidable collision risk, controlling the vehicle actuator system to cause the vehicle to leave the road boundary to avoid the collision within the road boundary when leaving the road boundary would avoid collision with the collision object and the second collision object, and
when the risk of collision with the collision object and the second collision object exceeds the predetermined unavoidable collision risk, estimate a severity of collision with the collision object and with the second collision object based on input from the vehicle sensor system, and control the vehicle actuator system to cause the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

18. The vehicle control system according to claim 12, wherein the electronic control unit is further programmed to:

determine positions of a road boundary based on input from the vehicle sensor system; and while controlling the vehicle in the crash mitigation mode after the vehicle is determined to be operating in the high-risk environment, estimate a risk of collision with the collision object and a second collision object based on input from the vehicle sensor system, and when the risk of collision with the collision object and the second collision object exceeds a predetermined unavoidable collision risk, controlling the vehicle actuator system to cause the vehicle to leave the road boundary to avoid the collision within the road boundary when leaving the road boundary would avoid collision with the collision object and the second collision object, and when the risk of collision with the collision object and the second collision object exceeds the predetermined unavoidable collision risk, estimate a severity of collision with the collision object and with the second collision object based on input from the vehicle sensor system, and control the vehicle actuator system to cause the vehicle to collide with the collision object or the second collision object having a lower estimated severity of collision, wherein the severity of collision is estimated to be higher: as a relative velocity increases between the vehicle and the collision object, and between the vehicle and the second collision object; and when the collision object or the second collision object is identified as a rigid structure.

19. A vehicle, comprising:

a vehicle sensor system;

a vehicle actuator system; and a vehicle electronic control unit in communication with the vehicle sensor system and the vehicle actuator system, the electronic control unit being programmed to:

estimate a distance between the vehicle and a collision object based on input from the vehicle sensor system;

estimate trajectories of the vehicle and the collision object based on input from the vehicle sensor system;

determine a time to close encounter between the vehicle and the collision object based on the estimated trajectories;

determine whether the distance is less than a first predetermined distance;

determine whether the time to close encounter is less than a first predetermined time to close encounter;

determine that the vehicle is operating in a high-risk environment when at least one of:
  (i) the distance is less than the first predetermined distance; or
  (ii) the time to close encounter is less than the first predetermined time to close encounter;

when the vehicle is determined to be operating in the high-risk environment, controlling the vehicle actuator system to control the vehicle in a crash mitigation mode by generating vehicle control commands using an occupant comfort parameter within a crash mitigation range of the occupant comfort parameter; and when the vehicle is not determined to be operating in the high-risk environment, controlling the vehicle actuator system to control the vehicle in a motion planning mode by generating vehicle control commands using the occupant comfort parameter within a motion planning range of the occupant comfort parameter, the motion planning range of the occupant comfort parameter being higher than the crash mitigation range of the occupant comfort parameter, wherein the occupant comfort parameter is used to set an allowable degree of change of acceleration, deceleration, and steering of the vehicle in generating the vehicle control commands, where the allowable degree of change of acceleration, deceleration, and steering of the vehicle is proportionally reduced as the occupant comfort parameter increases, and the allowable degree of change of acceleration, deceleration, and steering of the vehicle is proportionally increased as the occupant comfort parameter decreases.

20. The vehicle according to claim 19, wherein the electronic control unit is further programmed to:

while controlling the vehicle actuator system in the crash mitigation mode after the vehicle is determined to be operating in the high-risk environment, switching control of the vehicle actuator system to the motion planning mode when:

when the vehicle is determined to be operating in the high-risk environment due to the distance being less than the first predetermined difference, the distance changes to be greater than a second predetermined distance, the second predetermined distance being greater than the first predetermined distance;

when the vehicle is determined to be operating in the high-risk environment due to the time to close encounter being less than the first predetermined time to close encounter, the time to close encounter changes to be greater than a second predetermined time to close encounter, the second predetermined time to close encounter being greater than the first predetermined time to close encounter; and when the vehicle is determined to be operating in the high-risk environment due to the distance being less than the first predetermined difference and due to the time to close encounter being less than the first predetermined time to close encounter, the distance changes to be greater than the second predetermined distance and the time to close encounter changes to be greater than the second predetermined time to close encounter.

* * * * *